United States Patent [19]

Kohtani et al.

[11] Patent Number: 5,572,499
[45] Date of Patent: Nov. 5, 1996

[54] IMAGE PROCESSING APPARATUS FOR STORING IMAGE DATA IN STORAGE MEDIUM AND/OR FOR REPRODUCING IMAGE STORED IN STORAGE MEDIUM

[75] Inventors: Hideto Kohtani; Yoshinobu Aiba; Takahiro Ushiro, all of Yokohama, Japan

[73] Assignee: Canon Kabushiki Kaisha, Tokyo, Japan

[21] Appl. No.: 308,944

[22] Filed: Sep. 20, 1994

Related U.S. Application Data

[63] Continuation of Ser. No. 864,541, Apr. 7, 1992, abandoned.

[30] Foreign Application Priority Data

Apr. 10, 1991 [JP] Japan .................................. 3-104864
Jul. 31, 1991 [JP] Japan .................................. 3-214736

[51] Int. Cl.$^6$ .................................................. G11B 27/00
[52] U.S. Cl. .................................................. 369/83
[58] Field of Search ........................... 369/83, 84, 48; 364/513.13, 513.22; 358/311, 342, 335, 316; 360/14.1, 15, 33.1, 27, 13

[56] References Cited

U.S. PATENT DOCUMENTS

| | | | |
|---|---|---|---|
| 4,685,001 | 8/1987 | Martin | 360/14.1 |
| 4,833,625 | 5/1989 | Fisher et al. | 364/413.22 |
| 4,972,274 | 11/1990 | Becker et al. | 369/84 |
| 5,063,493 | 11/1991 | Shiori et al. | 369/83 |

FOREIGN PATENT DOCUMENTS

| | | |
|---|---|---|
| 55-43670 | 3/1980 | Japan . |
| 61-153769 | 7/1986 | Japan . |
| 62-140176 | 6/1987 | Japan . |
| 63-724 | 1/1988 | Japan . |
| 2-284259 | 11/1990 | Japan . |

*Primary Examiner*—Nabil Z. Hindi
*Attorney, Agent, or Firm*—Fitzpatrick, Cella, Harper & Scinto

[57] ABSTRACT

An image processing apparatus has an input device such as a scanner for inputting an original image, and a mode setting device for setting an editorial processing mode such as trimming, enlargement or size reduction to be executed on the input image. The apparatus further has a processing device for performing, in accordance with the editorial processing mode set by the mode setting device, the editorial processing on the image input by the input device. The apparatus further has a storage control device for storing, in a storage medium such as a disk, the image after the editorial processing performed by the processing device, together with reproduction data which corresponds to the executed editorial processing mode. The reproduction data is used for reproducing the original input image from the image after the editorial processing.

7 Claims, 18 Drawing Sheets

| MEMORY FILE MANAGEMENT TABLE |
| HEADER INFORMATION OF FILE 1 |
| EDITING CONTENTS OF FILE 1 |
| CONTENTS OF FILE 1 |
| DATA FOR REPRODUCTION OF FILE 1 |
| HEADER INFORMATION OF FILE 2 |
| EDITING CONTENTS OF FILE 2 |
| CONTENTS OF FILE 2 |
| DATA FOR REPRODUCTION OF FILE 2 |
| ⋮ |

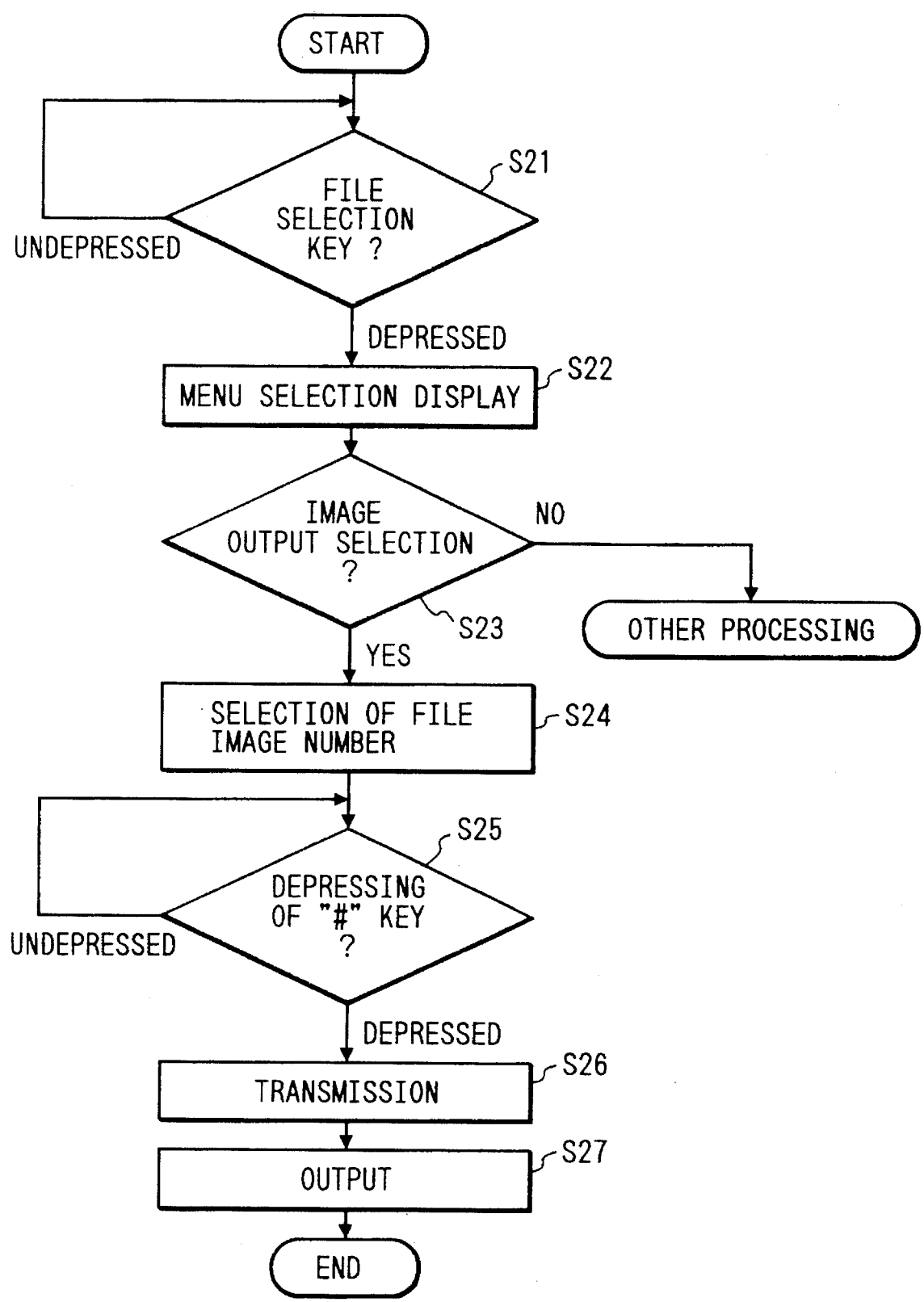

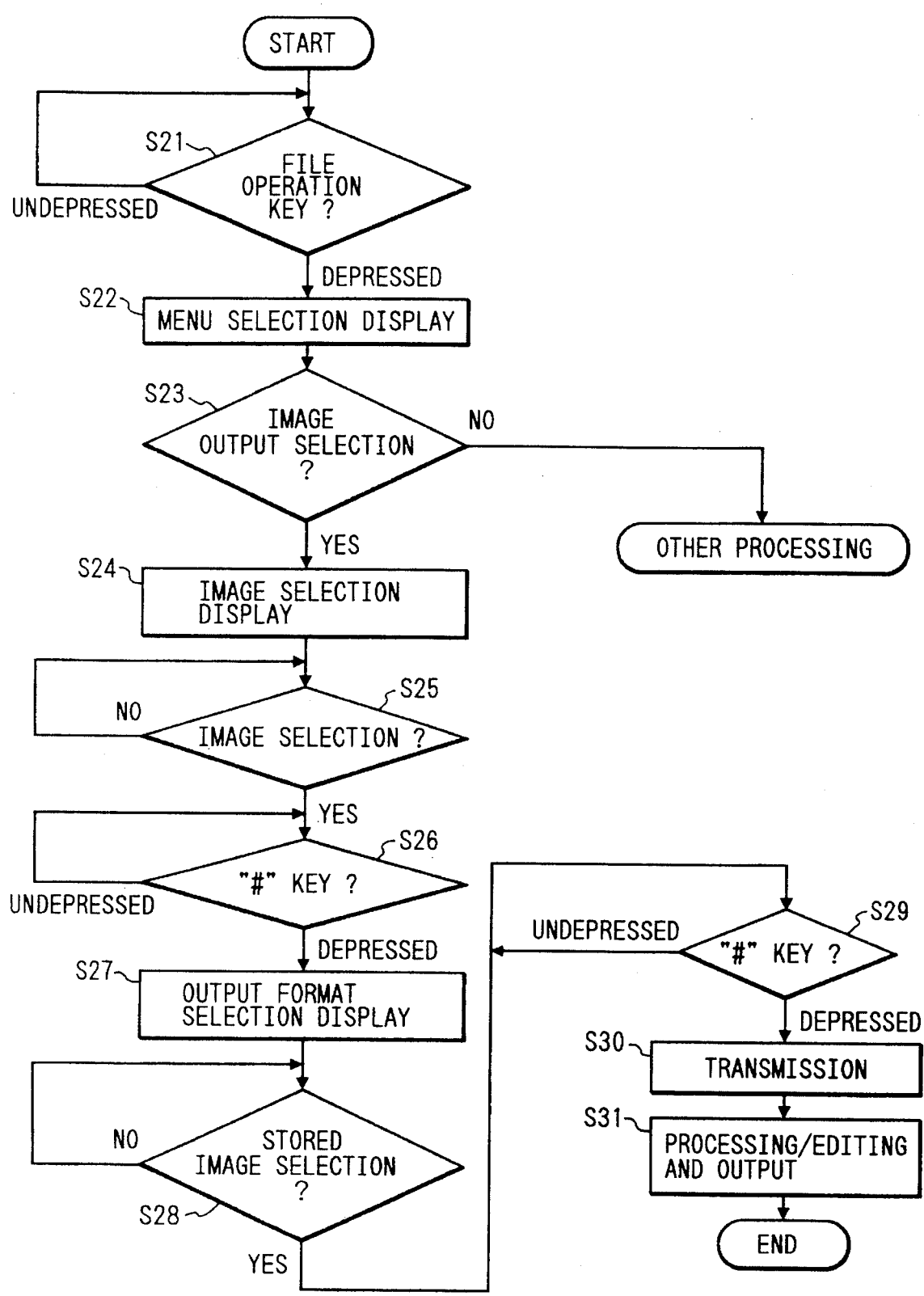

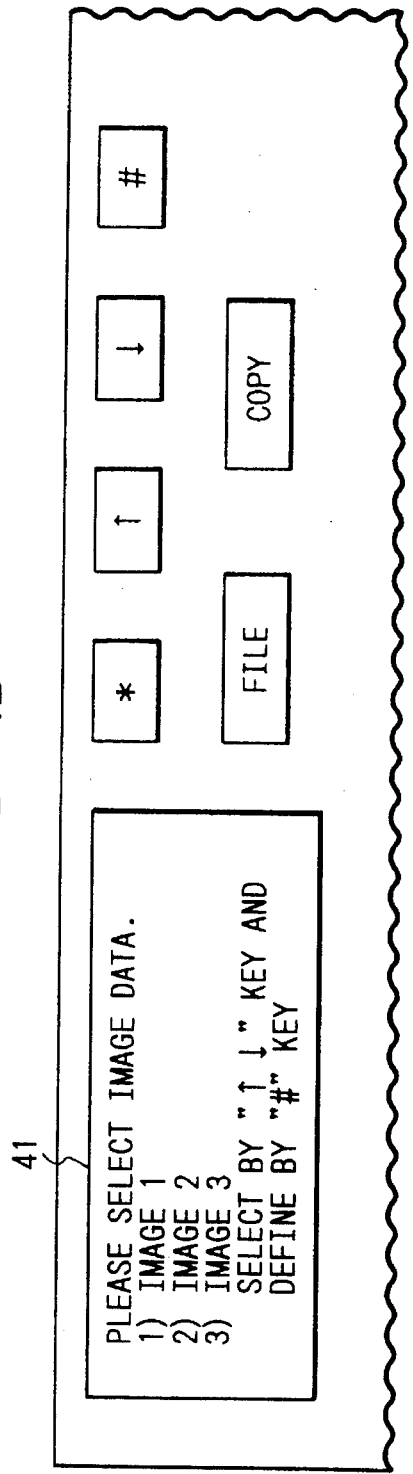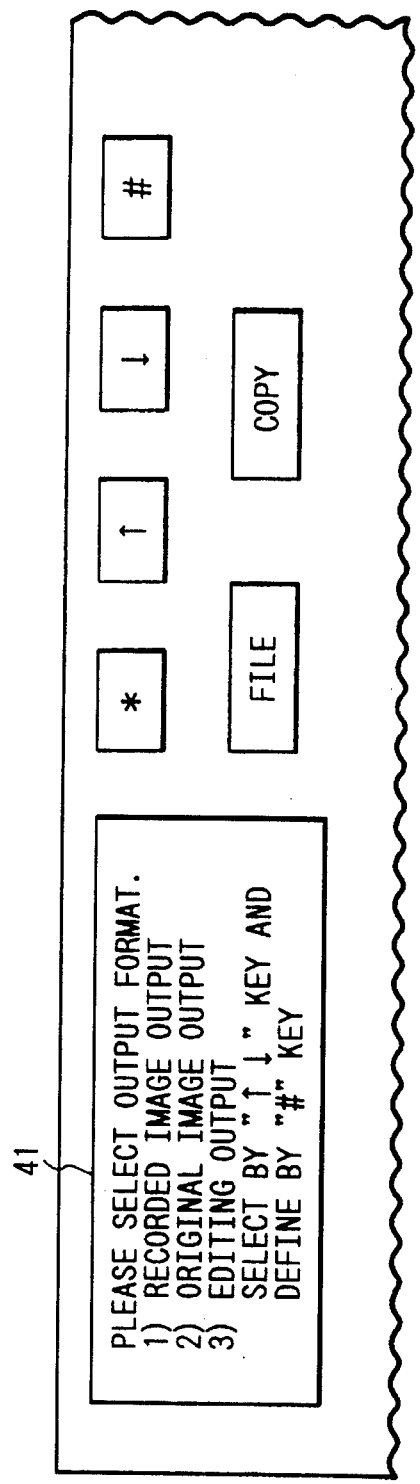

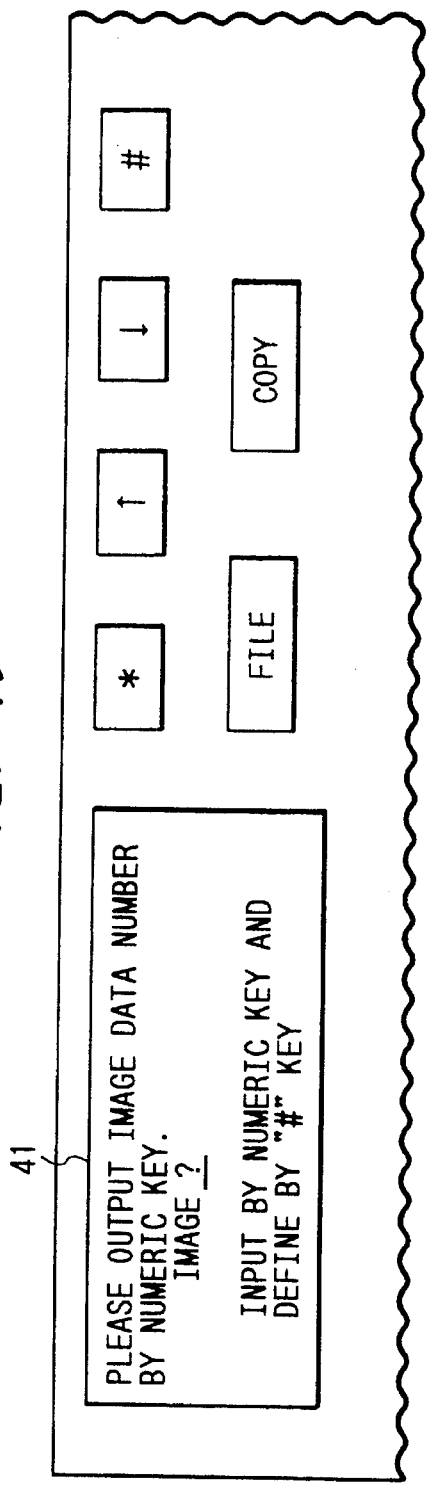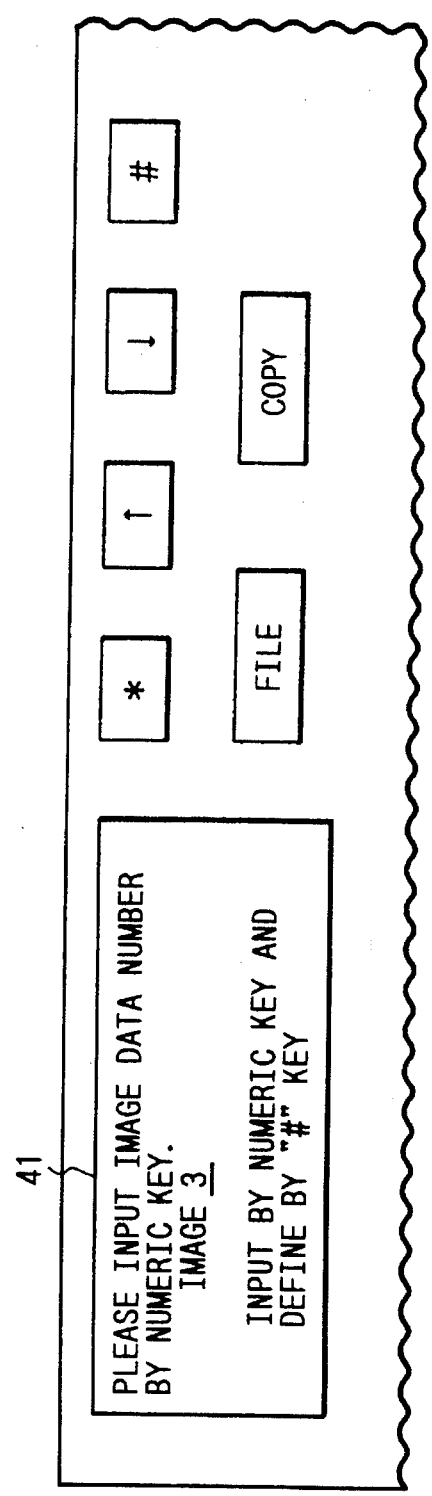

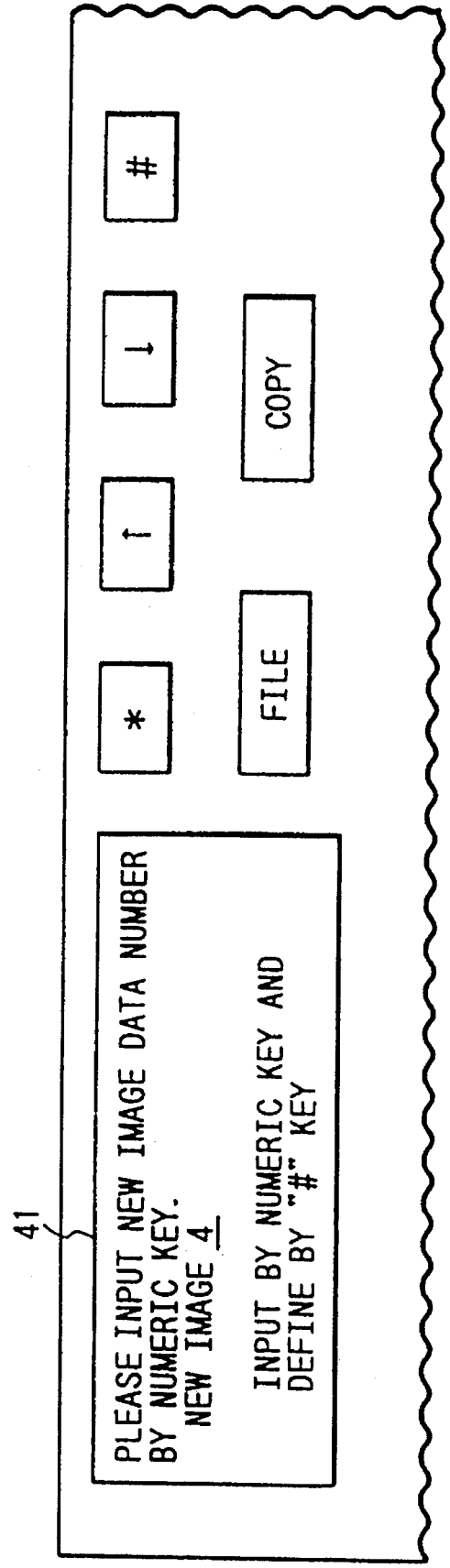

IMAGE PROCESSING APPARATUS FOR STORING IMAGE DATA IN STORAGE MEDIUM AND/OR FOR REPRODUCING IMAGE STORED IN STORAGE MEDIUM

This application is a continuation of prior application, Ser. No. 07/864,541 filed Apr. 7, 1992, now abandoned.

BACKGROUND OF THE INVENTION

1. Field of the Invention

The present invention relates to an image processing apparatus for storing an image in a storage medium such as an opto-magnetic disk and/or for reproducing an image stored in such a storage medium.

2. Related Background Art

An electronic file system has been known which stores or files various image data read through a scanner. Usually, this type of system is designed to enable desired processing of the image data such as addition, edition and so forth, and to store the processed image data in a storage medium such as an opto-magnetic disk. It is also possible to read the image data stored in the storage medium and to effect processings such as addition or edition of data, followed by storing the processed data again in the storage medium.

It is often experienced that the original data, i.e., the data before processing, is needed after completion of the processing.

In the known electronic file system of the type described, however, storage of the processed data is conducted such that the processed data is written over the original data, so that the original data cannot be recovered once the processing is conducted.

In order to obviate this shortcoming, Japanese Laid-Open Patent Appln. No. 55-43670 proposes an apparatus which stores both original image before processing such as edition and a processed image. This apparatus, however, inconveniently requires a large storage area for storing both the original and processed images.

Another solution is disclosed in Japanese Laid-Open Patent Appln. No. 61-153769 in which, when processing such as edition is effected on an image stored in a storage medium, the storage medium stores both the address data of the original image before the processing and information showing the content of the processing such as the edition. When the processed image is to be reproduced, the stored original image is reproduced after processing which is conducted in accordance with the stored processing information read from the storage medium. This apparatus also has a drawback in that, when an identical processing is to be conducted on a plurality of images stored in the storage medium, the processing information indicating the content of the processing such as the edition has to be stored for each of the images, thus uneconomically consuming the storage area. Usually, the image after processing such as edition is a revision of the original image, so that the processed image is more frequently reproduced than the original image. It is quite inconvenient that the time required for the reproduction is prolonged due to the necessity of the processing which is conducted in accordance with the stored processing information.

SUMMARY OF THE INVENTION

Accordingly, an object of the present invention is to provide an image processing apparatus which can overcome the above-described problems of the known art.

Another object of the present invention is to provide an image processing apparatus which can easily reproduce an original image even after a processing such as an edition, and which can improve the efficiency of use of image filing memory, while preventing omission of data.

Still another object of the invention is to provide an image processing apparatus which is capable of efficiently storing and reproducing a plurality of images which have undergone an identical processing.

Other objects, features and advantages of the present invention will become clear from the following description of the preferred embodiments taken in conjunction with the accompanying drawings.

BRIEF DESCRIPTION OF THE DRAWINGS

FIG. 7 is a flow chart illustrating the operation for outputting an image in the first embodiment;

FIG. 12 is a flow chart showing normal image outputting operation performed in the second embodiment;

FIG. 13 is a plan view of a display section in the second embodiment displaying an image selection menu;

FIG. 14 is a plan view of the display section of the second embodiment displaying an output mode selection menu;

FIG. 19 is a plan view of the display section of the third embodiment, displaying an image number input menu;

FIG. 20 is a plan view of the display section of the third embodiment, in a state appointing an image number;

FIG. 24 is a plan view of the display shown in FIG. 23 in which a new image number is being entered.

DESCRIPTION OF THE PREFERRED EMBODIMENTS

Figures 1, 6:
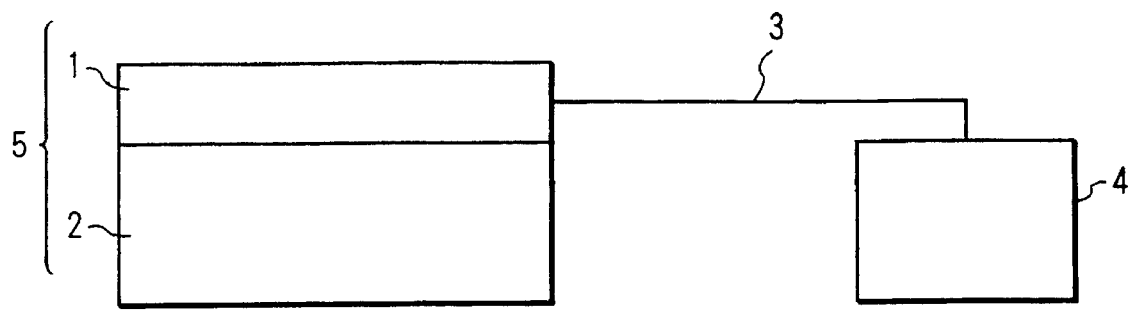
FIG. 1 is a block diagram showing the construction of a system as a first embodiment of the present invention.
FIG. 6 is a schematic illustration of states of data filed in an opto-magnetic disk used in the first embodiment.

FIG. 1 is a block diagram showing an image processing apparatus as a first embodiment of the present invention.

This image processing apparatus has a scanner 1 and a printer 2 which are provided on a body 5. Normally, this apparatus is used as a copying apparatus in which image data read by the scanner 1 is printed out by the printer 2. It is also possible to store or file the image data read by the scanner in a storage medium such as an opto-magnetic disk. To this end, the read image is transmitted to an opto-magnetic disk drive device 4 through a communication line 3. The image processing apparatus of this embodiment is capable of digitally treating the read image, thus enabling various types of image proceeding.

Figure 2:
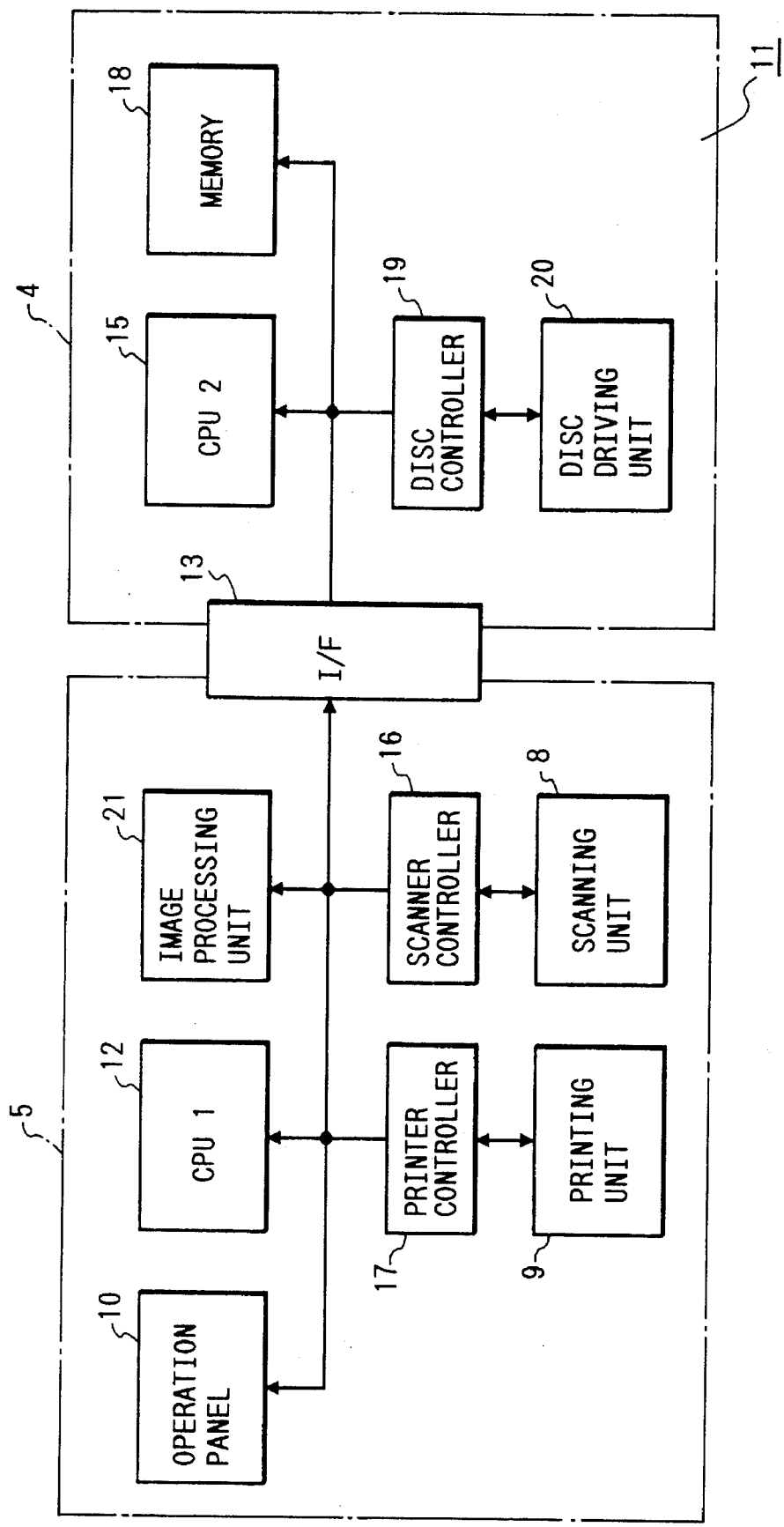
FIG. 2 is a block diagram showing an arrangement for performing filing operation in the first embodiment.

FIG. 2 is a block diagram showing an arrangement for performing the filing operation.

The body 5 of the apparatus carries a scanning unit 8 for reading an image, a printing unit 9 for printing the read image on a recording paper, a CPU which commands the operation of the whole apparatus, an image processing unit 21 for performing various image processing on the image data, a scanner controller 16 for controlling the scanner 1; a printer controller for controlling the printer 2; and an operation panel 10 for enabling entry of various data and commands, as well as display control instruction.

The opto-magnetic disk drive device 4 has a filing unit 11 as illustrated. The filing unit 11 includes a CPU 15 which commands the operation of the opto-magnetic disk drive device 4, a disk controller 19 for controlling the operation of the opto-magnetic disk, a disk drive unit 20 which demountably mounts the opto-magnetic disk so as to enable read and write of data, and a memory 18 for developing the image data.

The body 4 and the filing unit 11 are electrically connected to each other through a filing interface 13.

Figure 3:
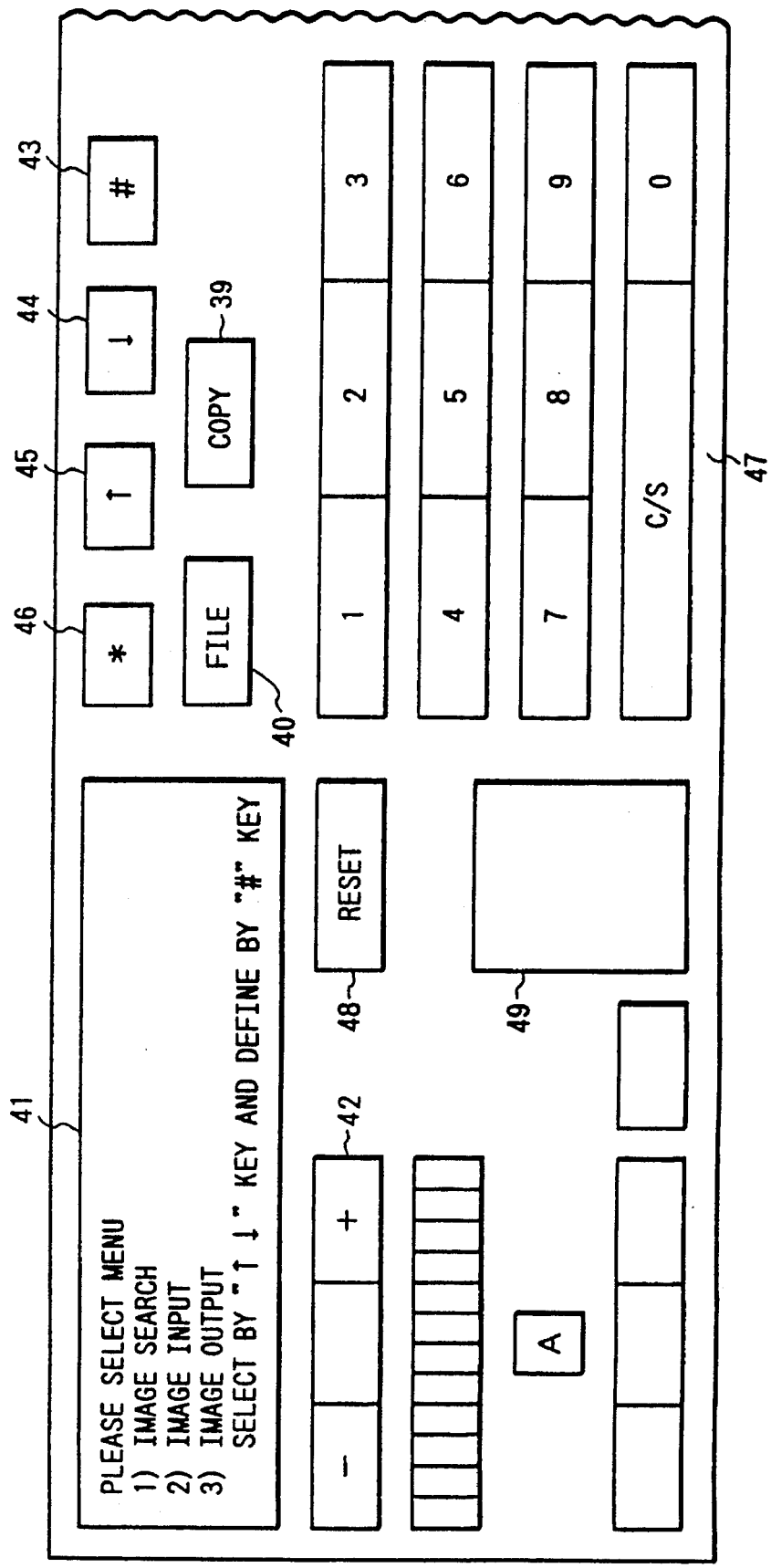
FIG. 3 is a plan view of an operation panel used in the first embodiment.

FIG. 3 is a plan view showing the construction of the operation panel 10.

The operation panel 10 has a copy operation key 39 for selecting a copy mode to enable copying operation, a filing operation key 40 for selecting a filing mode which enables filing of the image data, a liquid crystal display section 41 for displaying various operation menus, magnification/demagnification key 42, cursor set keys 43 to 46, a ten-key device for enabling numerical data such as the number of copies to be obtained, a reset key for resetting the operation mode from an image processing mode to a standard mode, a start key 49 for triggering ordinary reading or copying operation, and so forth.

Ordinary copying operation is triggered by a starting instruction entered by means of the start key 49 on the operation panel 10. In response to the starting instruction, the CPU operates to activate the scanner controller 16 thereby controlling the scanning unit 8. The scanning unit 8 scans and reads an original which is placed on an original table, and multi-value image data corresponding to the read image is sent to the image processing unit 21.

The image processing unit 21 compares the levels of the multi-value image data signals carried by each pixel with a predetermined threshold level, and performs various types of processings such as conversion of the image data into binary data, separation of the image into character data portion and halftone data through analysis of space frequency of the image, and extraction or omission of a specific portion of the read image. These processings are executed in accordance with the image processing modes set through the operation panel 10.

Figure 4:
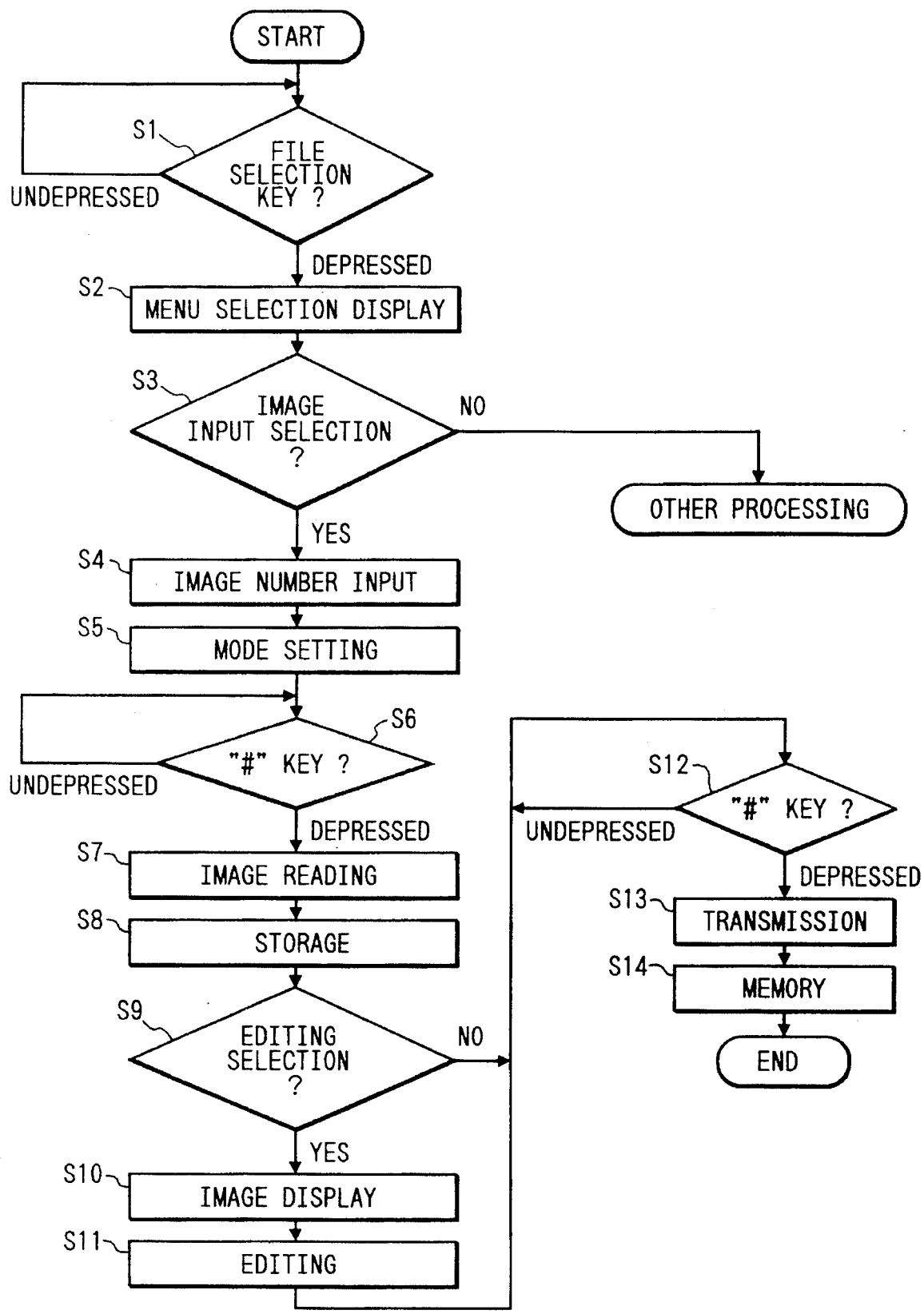
FIG. 4 is a flow chart illustrating the operation for filing image data in the first embodiment.

FIG. 4 is a flowchart showing the operation for filing the image data.

For the purpose of filing the image data, the user presses the filing operation key 40 in step S1 so that a menu selection menu as shown in FIG. 3 is displayed on the display section 41 in step S2. If the user selects the image input mode in step S3, the operation mode is changed to the image input mode. The user then enters an image number through an image number entry menu (not shown) in step S4 and, after setting the operation to a reading mode by a read mode setting menu (not shown) in step S5, presses a "#" key 43 in step S6, whereby reading operation is started in step S7 for reading an original placed on the original table.

In step S8, the read image data is accumulated in the image processing unit 21. When it is desired to effect a processing such as trimming on the image data, the user selects the desired processing on an editing menu (not shown) in step S9. In response to the selection, the outline of the read image is displayed on the display section 41. It is possible to use a separate display device such as a CRT for the purpose of displaying the read image. In step S11, desired editorial work is conducted by, for example, appointment of the area or region to be processed. Then, the operator presses the "#" key 43 in step S12, whereby the filing operation is executed to file the image data in the storage medium.

More specifically, in step S13, the CPU sends to the filing unit 11 via the filing interface 13 both the image data after the processing/edition and reproduction data for restoring the original data from the image data after processing/edition. In step S14, the CPU 15 on the filing unit 11 sends to the opto-magnetic disk set on the disk drive unit 20, via the disk controller 19, both the processed image data and the reproduction data together with heading data (retrieval data). Consequently, the image data after the processing/edition and the reproduction data for recovering the original image data are stored in the disk together with the heading data.

Figure 5:
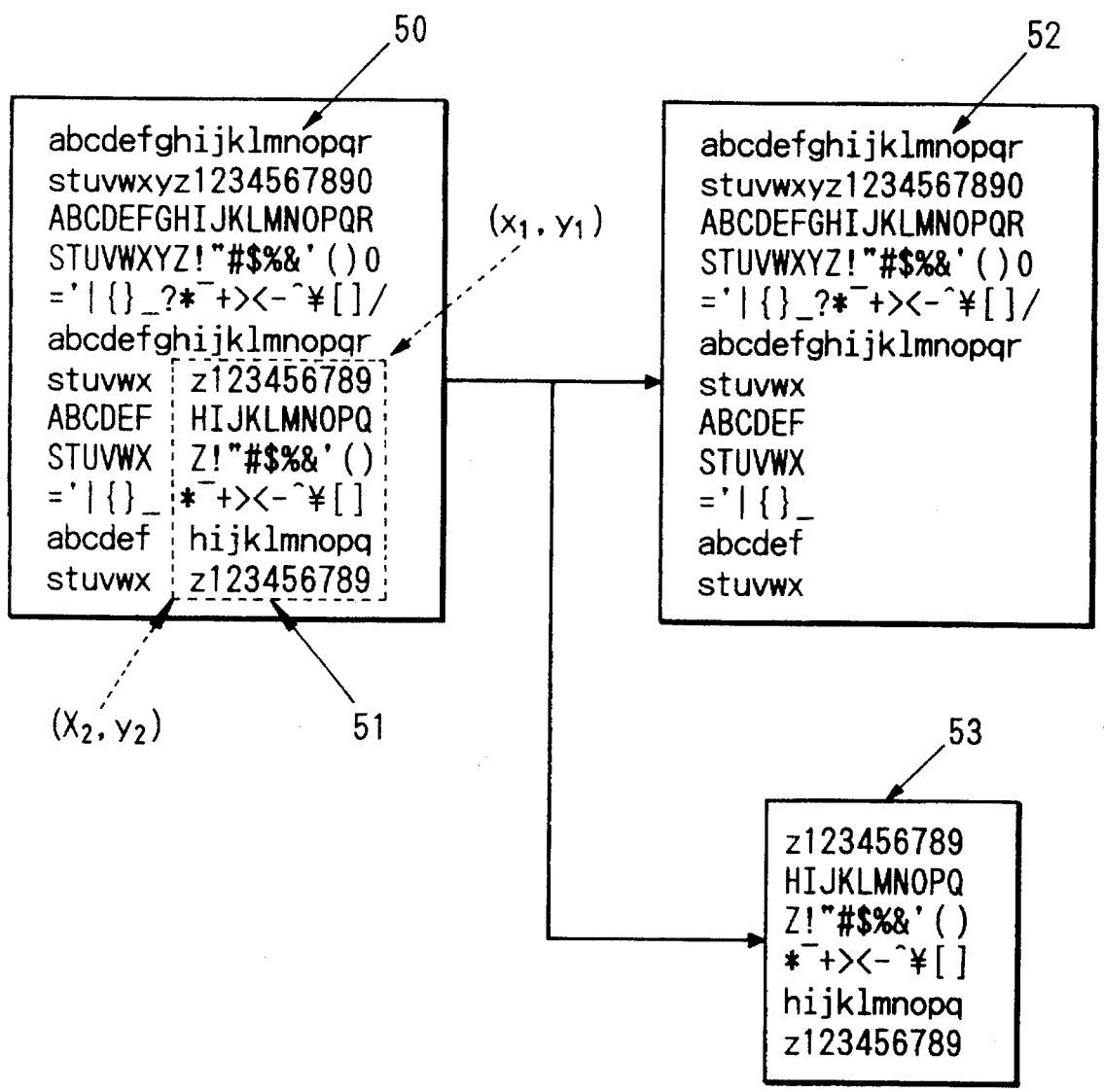
FIG. 5 is a schematic illustration of a trimming operation performed in the first embodiment.

FIG. 5 is a schematic illustration of an example of the editorial processing conducted in step S11 of the flow shown in FIG. 4.

It is assumed that editing instruction has been given to mask a region 51 determined by diagonal coordinates (x1, y2), (x2, y2) of the original image 50. The appointment of the region can be conducted through the operation panel or by means of a tablet (not shown) for inputting coordinate values. By conducting such a trimming, it is possible to obtain an image in which the appointed region has been erased.

The image data, obtained by erasing the region 51 from the original image 50 and, as necessitated, data representing the content of the processing/edition are stored in the disk. At the same time, the above-mentioned reproduction data is stored in the disk. The reproduction data, in this case, includes data representing the content of processing/edition, image data contained in the region 51, and the coordinate data (x1,y2), (x2, y2) indicating the position of the region 51. FIG. 6 is a schematic illustration of the state of filing of each data in the opto-magnetic disk.

FIG. 7 is a flow chart showing a process for outputting an image.

For the purpose of outputting image data from the opto-magnetic disk, the operator presses the filing operation key 40 in step S21 so that the image shown in FIG. 3 is displayed in step S22. In step S23, the operator selects a mode for outputting the image. Then, the operator selects the image number of the image to be output, by means of an image selection menu which is not shown.

The operator then presses the "#" key 43 in step S25, so that the CPU 12 transmits the printing instruction to the CPU 15 which then operates to call the designated image data stored in the opto-magnetic disk, so that the called image data is developed in the memory 18. The developed image is then transmitted to the image processing unit 21 through the filing interface 13, in step S26. Then, the CPU 12 operates to transmit the image data from the image processing unit 21 to the controller 17 in step S27, thereby performing printing.

When, for example, the operator has input an instruction in step S24 for recovering the original image, i.e., the image before the processing/edition, the CPU reads the image data and the aforesaid reproduction data from the opto-magnetic disk, together with the header information of the file corresponding to the image to be recovered. The CPU 15 then develops the image data in the memory 18 and, at the same time, stores the reproduction data in another area of the memory 18, so that the processed/edited image is again processed back in accordance with the reproduction data, i.e., the coordinate data, data representing the content of the edition and the image data in the masked region,thereby restoring and reproducing the original image data. Namely, the image which originally existed in the masked region is added to the processed/edited image.

It is thus possible to restore and reproduce the original image.

Figure 8:
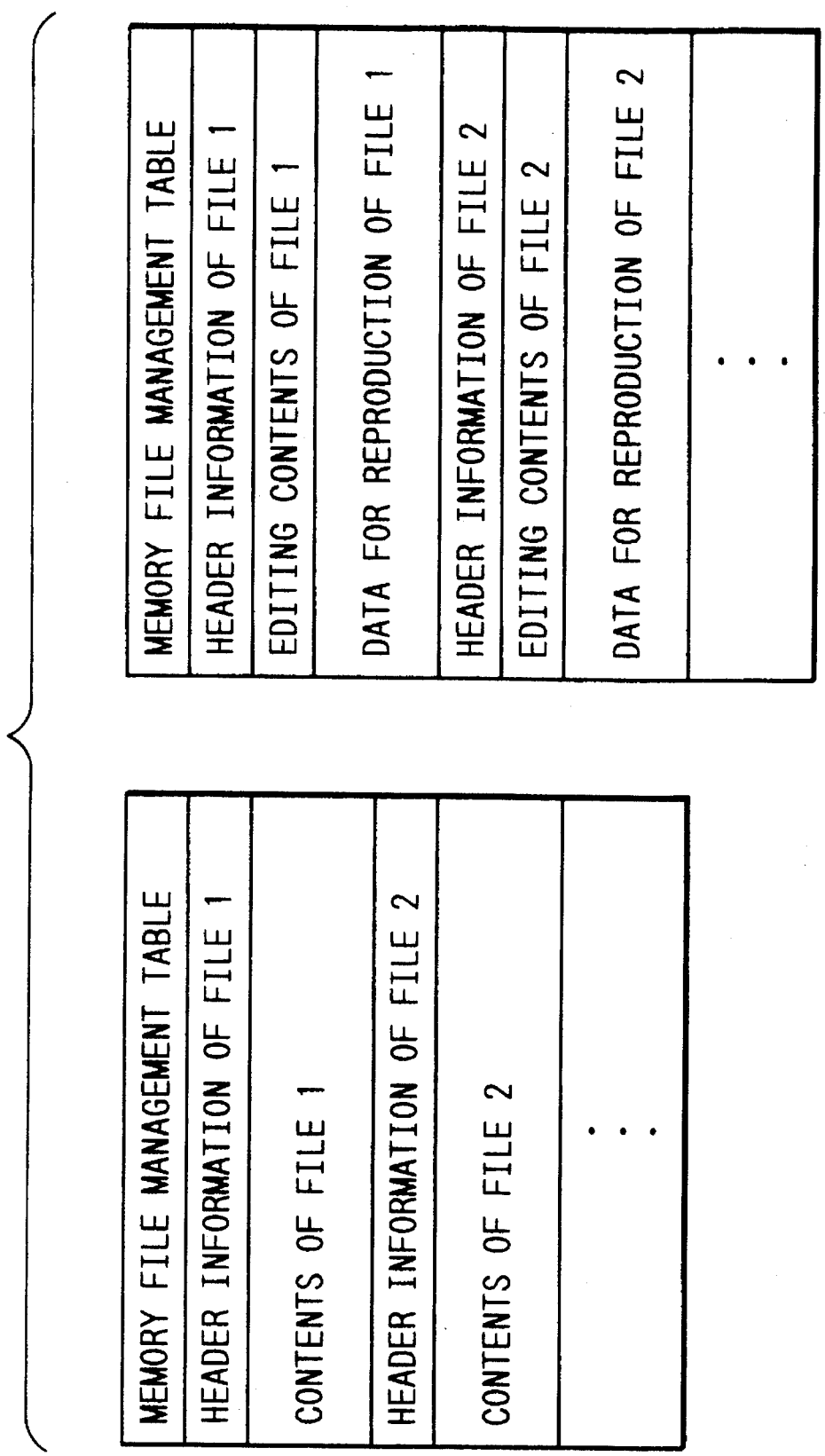
FIG. 8 is a schematic illustration of states of data filed in an opto-magnetic disk used in a second embodiment of the present invention.

In the described embodiment, the processed/edited image data and the reproduction data are stored in the common opto-magnetic disk. This, however, is only illustrative and these two types of data may be stored in separate opto-magnetic disks. FIG. 8 illustrates an example of such a method of storage.

Thus, the storage method shown in FIG. 8 is to store the reproduction data in another auxiliary disk. This storage method is advantageous from the viewpoint of economical use of the storage area, considering that the users in most cases are much more interested in the processed/edited image than the original image.

When the storage method shown in FIG. 8 is used, i.e., when the processed/edited image data and the reproduction data are stored in separate disks, it is necessary to drive these disks separately. This can be conducted by manually replacing the disks on a single disk drive or, alternatively, the apparatus may have two disk drives for driving these disks independently.

Although a trimming processing has been specifically described as an example of the processing/editing work, it will be clear to those skilled in the art that other kinds of processing/editing work can be performed equally well by the described embodiment.

A second embodiment of the present invention will now be described.

Figure 9:
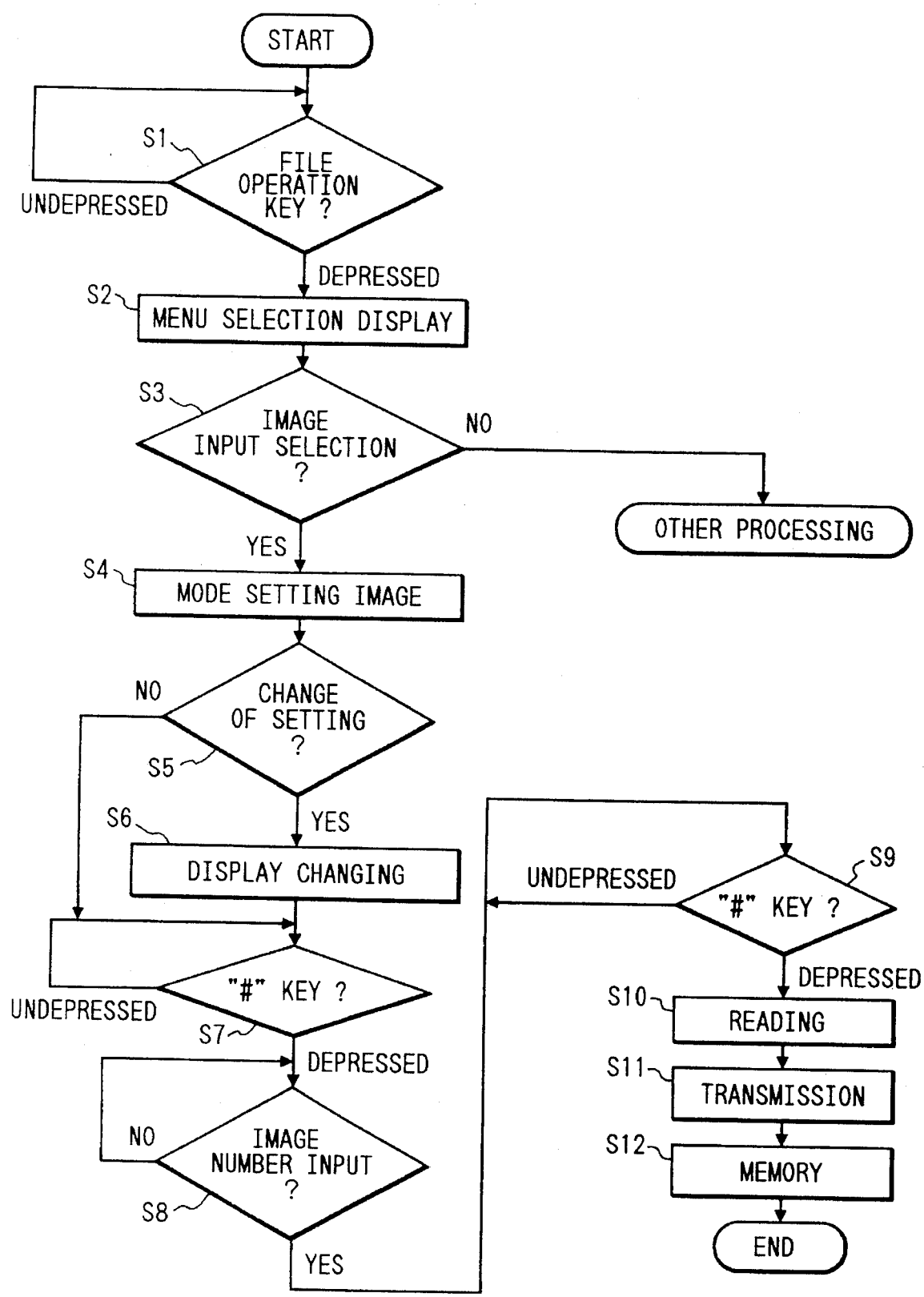
FIG. 9 is a flow chart showing filing operation performed in the second embodiment.

FIG. 9 is a flow chart illustrating a process performed in the second embodiment for filing image data. The second embodiment employs a hardware structure which is substantially the same as that of the first embodiment.

Figure 10:
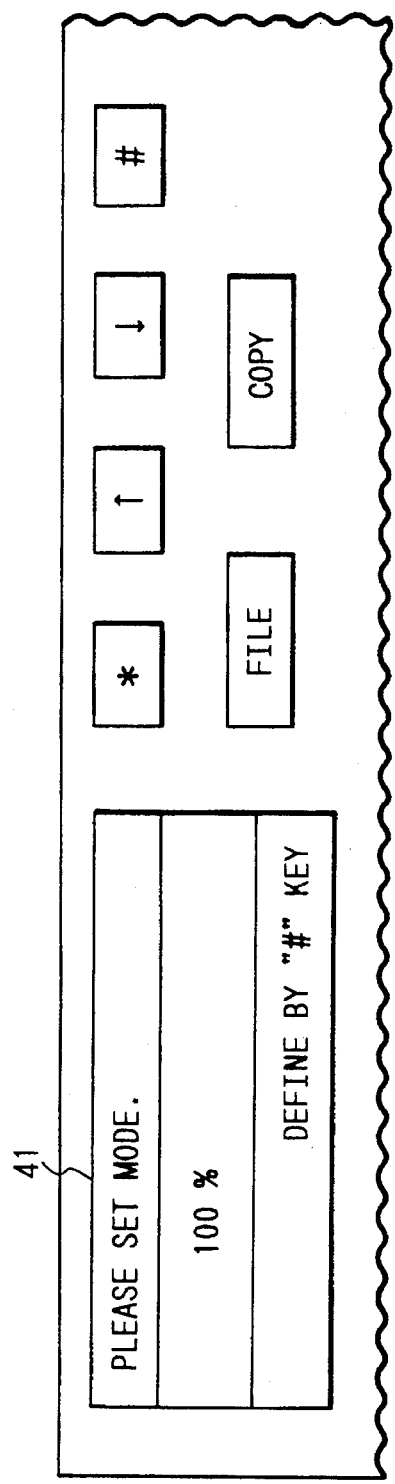
FIG. 10 is a plan view illustrating a mode setting menu on a display section.
Figure 11:
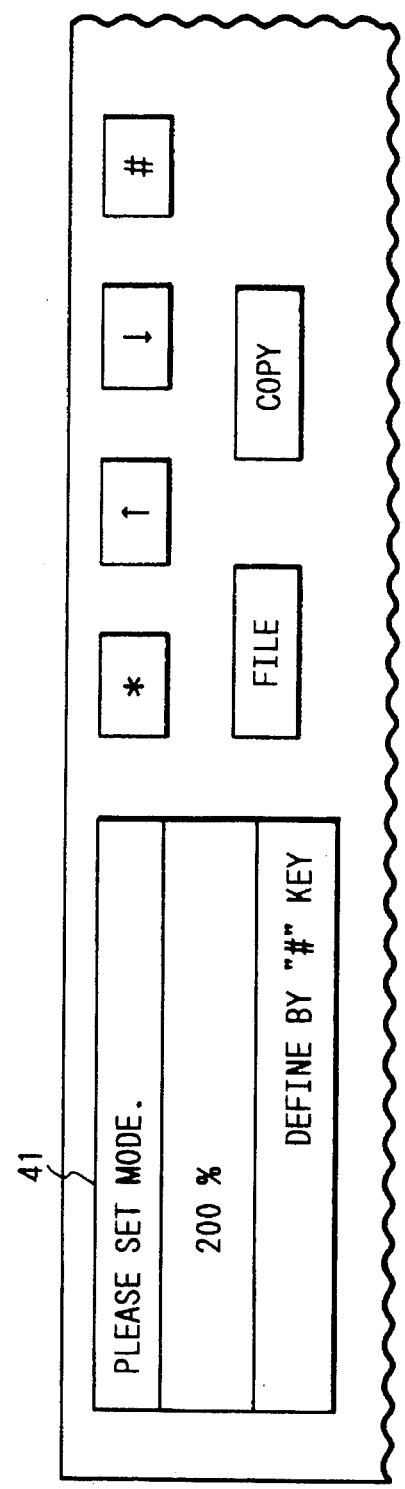
FIG. 11 is a plan view illustrating a mode setting menu selecting 200% enlargement mode.

For the purpose of filing image data, the operator presses the filing operation key 40 (step S1), so that a menu selection menu shown in FIG. 3 is displayed in the display section 41 (step S2). The operator then selects "image input" (step S3), so that a mode setting menu as shown in FIG. 10 is displayed, thus presenting the image edition setting mode (step S4). The operator then presses, for example, an enlargement key 42 to select 200% enlargement (step S5), so that a display as shown in FIG. 11 is obtained (step S6). After the determination of the mode, the user presses the "#" key 43 in step (S7), and then inputs the image number (step S8). The "#" key 43 is pressed again (step S9), thus initiating the reading of the original placed on the original table (step S10).

The image data thus read, together with image processing/edition data, is transmitted to the filing unit 11 through the interface 13 (step S11). In this case, therefore, the image data stored in the disk is the same one as the original image data read by the scanner 1, and the processing/edition data is the data indicating 200% enlargement of the image size.

The CPU 15 of the filing unit 11 then operates to store the image data and the processing/edition data in the opto-magnetic disk set on the disk drive unit, via the disk controller 19 (step S12).

FIG. 12 is a flowchart illustrating the operation for outputting the image.

In order to output the image data stored in the opto-magnetic disk, the operator presses the filing operation key 40 (step S21) so that a display as shown in FIG. 3 is obtained (step S22). As the operator selects "image output" (step S23), the display proceeds to the image selection menu shown in FIG. 13 (step S24). The user then selects the desired image data by appointing the identification number of the image data (steps S25, S26). As a consequence, the display proceeds to show an output type selection menu shown in FIG. 14 (step S27). If the operator selects "recorded image output" (steps S28, S29), the CPU 12 transmits instructions indicative of this mode to the CPU 15. The CPU 15 then operates to read the image data and the processing/edition data stored in the opto-magnetic disk and to send these data to the image processing unit 21 through the filing interface 13 (S28). The CPU 12 then performs processing/edition of the image data in accordance with the processing/editing data (step S29). Namely, in this case, the image data is output after 200% enlargement.

Hitherto, when 200% enlargement is conducted as in the case of enlargement of A-4 size image data into A-3 size image data, the volume of the image data to be output is 4 times as large that of the original image data. According to the invention, however, the storage device is required only to store the image data of A-4 size and the data indicative of the magnification, so that the memory capacity can be reduced remarkably. Saving of storage area also is possible when the image data is compressed before the storage.

A description will now be given of the operation for inputting and outputting a group of image data.

Inputting of a group of image data containing plural image data can be conducted substantially in the same manner as that described before in connection with FIG. 9. Thus, the plural image data and processing/editing data are stored in an opto-magnetic disk. More specifically, after the determination of the mode performed in step S7 mentioned before, a plurality of original sheets are consecutively read by the assist of an automatic original feeder, and the resultant plural image data are sent together with the filing unit 11 so as to be stored in the opto-magnetic disk. When the group of image data are input together with the processing/editing data, an identical file name is given to these two types of data. In addition, information concerning the number of pages or sheets of the original is added to the processing/editing data.

Figure 15:
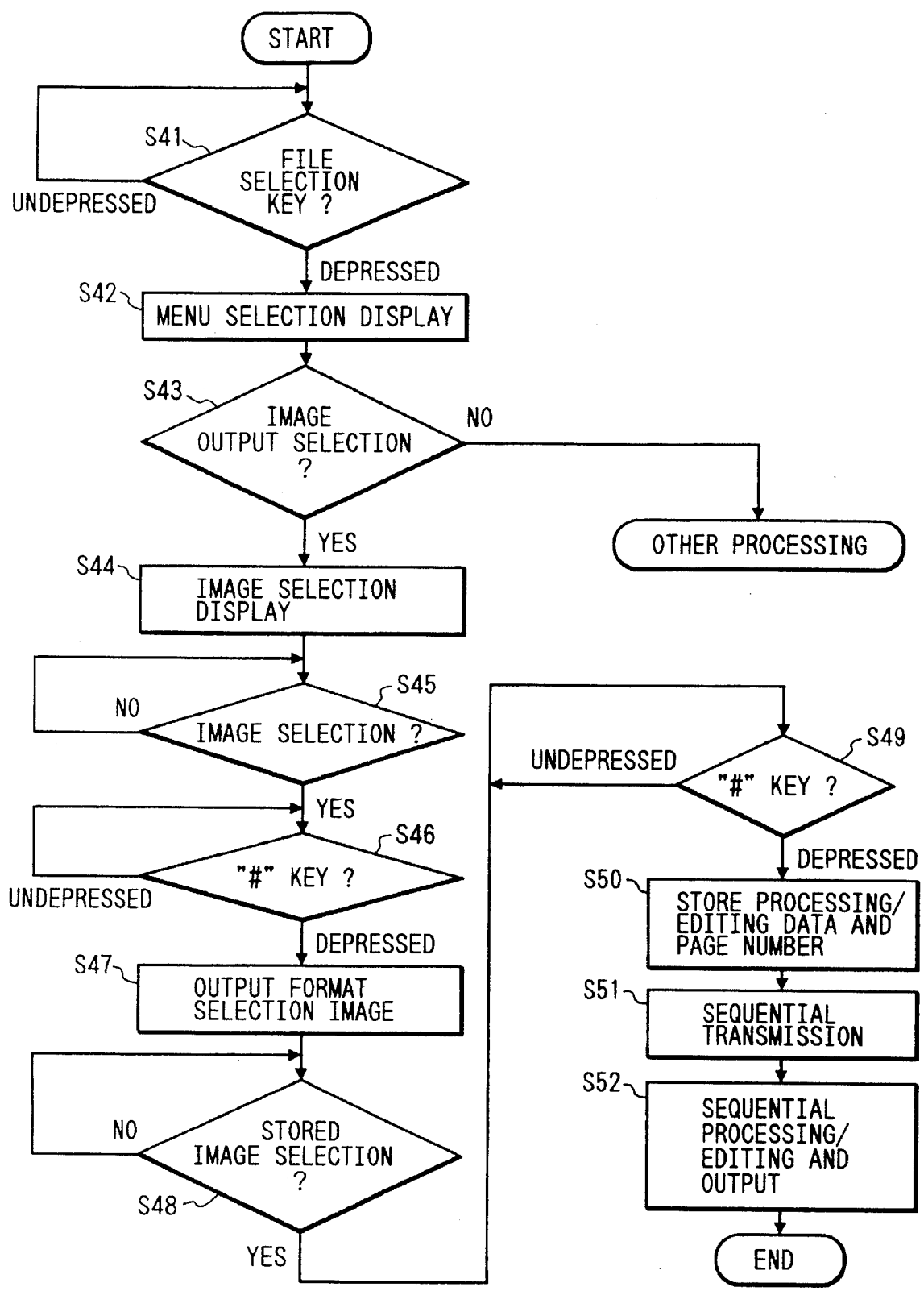
FIG. 15 is a flow chart illustrating an operation for outputting image data on an opto-magnetic disk used in the second embodiment.

FIG. 15 is a flow chart showing the process for outputting the group of image data stored in the opto-magnetic disk.

As in the process shown in FIG. 12, the process of FIG. 15 presents the menu shown in FIG. 3 so as to enable the operator to select "image output". Consequently, the display proceeds to show the menu of FIG. 13. As the operator selects the desired image data, a menu shown in FIG. 14 is displayed (steps S41 to S47). When the "recorded image output" is selected in the menu of FIG. 14 (steps S48, 49), this selection is transmitted from the CPU 12 to the CPU 15, so that the processing/editing data stored in the opto-magnetic disk is sent to the image processing unit 21. Then, the processing/editing data including the number of pages of the image data file is temporarily stored in a memory provided in the image processing unit 21 (S50).

Subsequently, the CPU 12 gives instruction to the CPU 15 to cause the latter to sequentially output the consecutive image data of the group stored in the opto-magnetic disk, from the first to the last pages of the group. Consequently, the consecutive image data are sent to the image processing unit 21 via the reading filing interface 13 (step S51). The CPU then performs image processing operation in accordance with the processing/edition data stored therein, on each of the consecutive image data each time the single page of image data is received (step S52).

In this embodiment, the storage device is required only to store the plural image data of consecutive pages and the single processing/editing data common for all these image data. This appreciably saves the storage area in the opto-magnetic disk.

It is also to be understood that this embodiment can equally be applied to the case where the image after the processing and edition is stored in the opto-magnetic disk.

Figure 16:
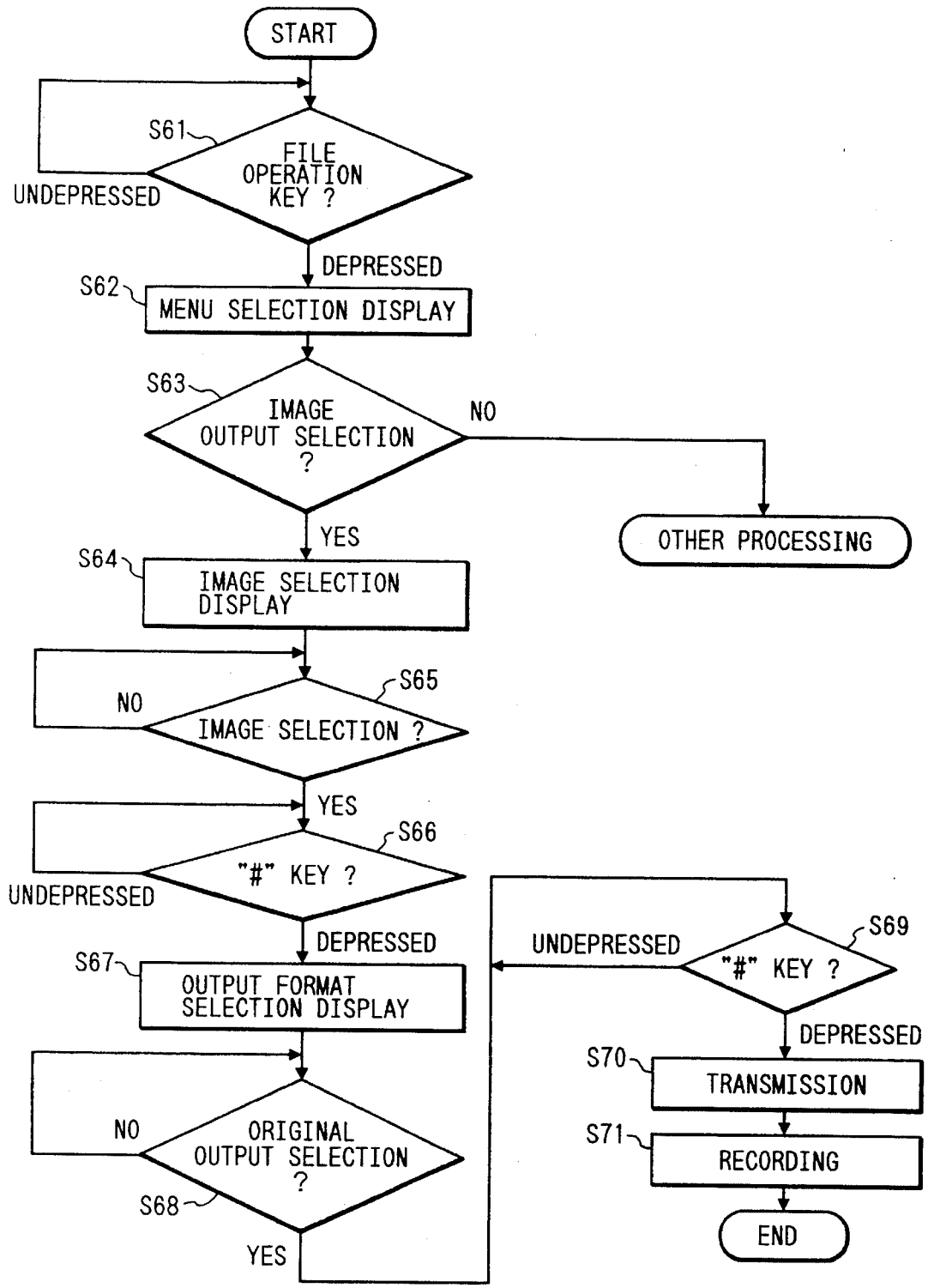
FIG. 16 is a flow chart illustrating an operation for outputting an original image in the second embodiment.

FIG. 16 is a flowchart showing the operation for outputting the original image, i.e., the as-read image.

In the process shown in FIG. 16, the operator selects "image output" on the menu shown in FIG. 3, as in the processes explained before in connection with FIGS. 12 and 15. As a result, the display advances to the menu shown in FIG. 13 to enable the operator to select the desired image. The operator then selects, on the menu of FIG. 14, "original image output" (steps S61 to S69). The CPU 12 sends the result of the selection to the CPU 15 so that the CPU reads the original image stored in the opto-magnetic disk and sends it to the image processing unit 21 via the reading filing interface 13 (step S70). The CPU 12 then operates the printing unit to print the image data on a recording paper (step S71).

In the second embodiment as described, it is thus possible to easily output the original image data, so that the original image can be restored with a high degree of fidelity, despite any edition such as contraction or trimming effected on the original image.

A description will now be given of a third embodiment of the present invention.

The image data filing system to which the third embodiment is applied is basically the same as that of the second embodiment. In the third embodiment, however, the stored processing/editing data alone can be read from the opto-magnetic disk, for the purpose of alteration. Thus, the hardware structure used in the third embodiment is materially the same as that of the second embodiment, so that the components of the hardware structure of the third embodiment are denoted by the same reference numerals as those used in the second embodiment.

Figure 17:
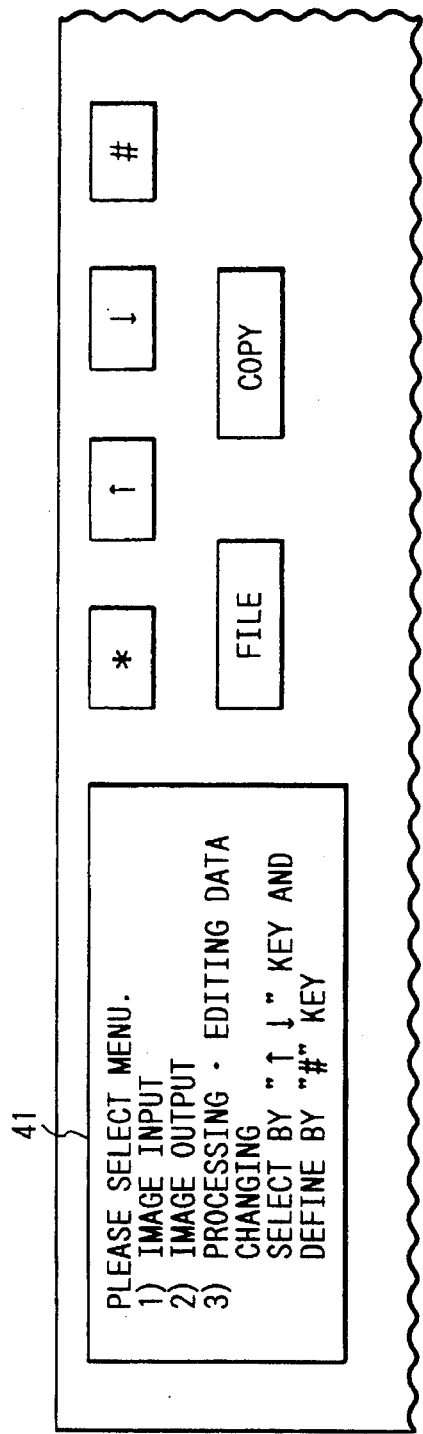
FIG. 17 is a plan view of a display section of a third embodiment, displaying a menu selection menu.

The third embodiment employs a selection menu shown in FIG. 17, which enables the operator to select "processing/editing data changing".

Figure 18:
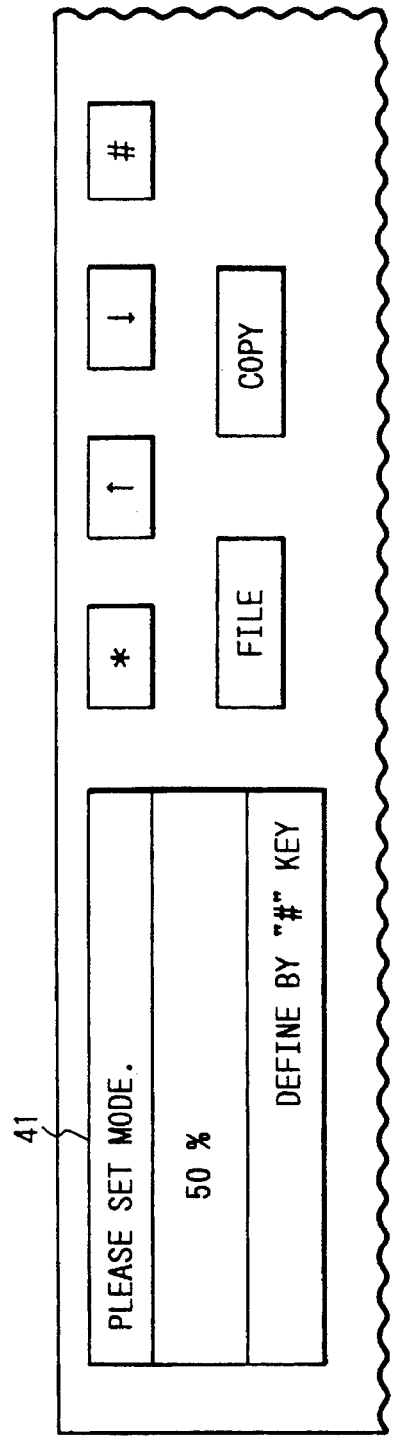
FIG. 18 is a plan view of a display section of the third embodiment, displaying a mode setting menu instructing 50% down-sizing.

Storage of image data and the processing/editing data is executed as follows. The operator selects, for example, "50% contraction" on the mode setting menu shown in FIG. 10. FIG. 18 shows the display obtained when the "50% contraction" is set. The display advances to an image number input menu shown in FIG. 19 in response to pressing of the "#" key 43 to enable the operator to input the image identification number 3 by means of the ten-key device 47 (step S20). The operator then presses the "#" key again, so that the same steps as the steps S9 onward in FIG. 9 are followed to store the image data and the processing/edition data in an opto-magnetic disk. In this case, however, preceding image data and preceding processing/editing data have been deleted.

For the purpose of outputting the image data, the operator selects "image output" on the menu shown in FIG. 17, so that the display is changed to show the menu of FIG. 14. The operator then enters the image identification number by means of the ten-key device 47, followed by pressing of the "#" key. The CPU 12 then transmits instructions indicative of the result of the selection to the CPU 15. The CPU then reads the image data and the processing/editing data from the opto-magnetic disk and sends these data to the image processing unit 21 through the reading filing interface 13. The CPU 12 then controls the image processing unit 21 so as to effect the processing/edition in the image data and sends the results of the processing/edition to the printing unit 9, thereby printing out the processed/edited image.

The operation described above is materially the same as that in the first embodiment.

By referring to FIG. 21, a description will now be given of the case where both the image data and the processing/editing data have been stored in the opto-magnetic disk and the processing/editing data alone is to be read and changed.

In this case, the operator selects "processing/editing data changing" on the menu shown in FIG. 17 (step S72). As a consequence, the display proceeds to show a menu shown in FIG. 19 (step S73) to enable the operator to enter the image identification number by means of the ten-key device 47 as shown in FIG. 20 (step S74). The operator then presses the "#" key (step S75), so that the display proceeds to show the initial mode setting menu of FIG. 18 (step S76). A change in processing editing data is then conducted. In this case, it is assumed that the content of the change is to change the magnification from 50% to 140% (step S76). The operator then presses the "#" key 43 (step S78), thus completing the change of the magnification (step S79). The processing/editing data thus changed is then transmitted to the filing unit 11. The CPU 15 of the filing unit then stores the changed processing/editing data in the opto-magnetic disk.

In this embodiment, the processing/editing data after the change is stored in place of the original processing/editing data, i.e., the data before the change, and the original processing/editing data is erased. This, however, is not exclusive and the arrangement may be such as to maintain both the original processing/editing data and the new processing/editing data.

A description will now be given of such a fourth embodiment which stores both the original processing/editing data and the new processing/editing data. The hardware structure, as well as the image data input/output operations, of the fourth embodiment is not fully described because it is substantially the same as that of the third embodiment.

Figure 21:
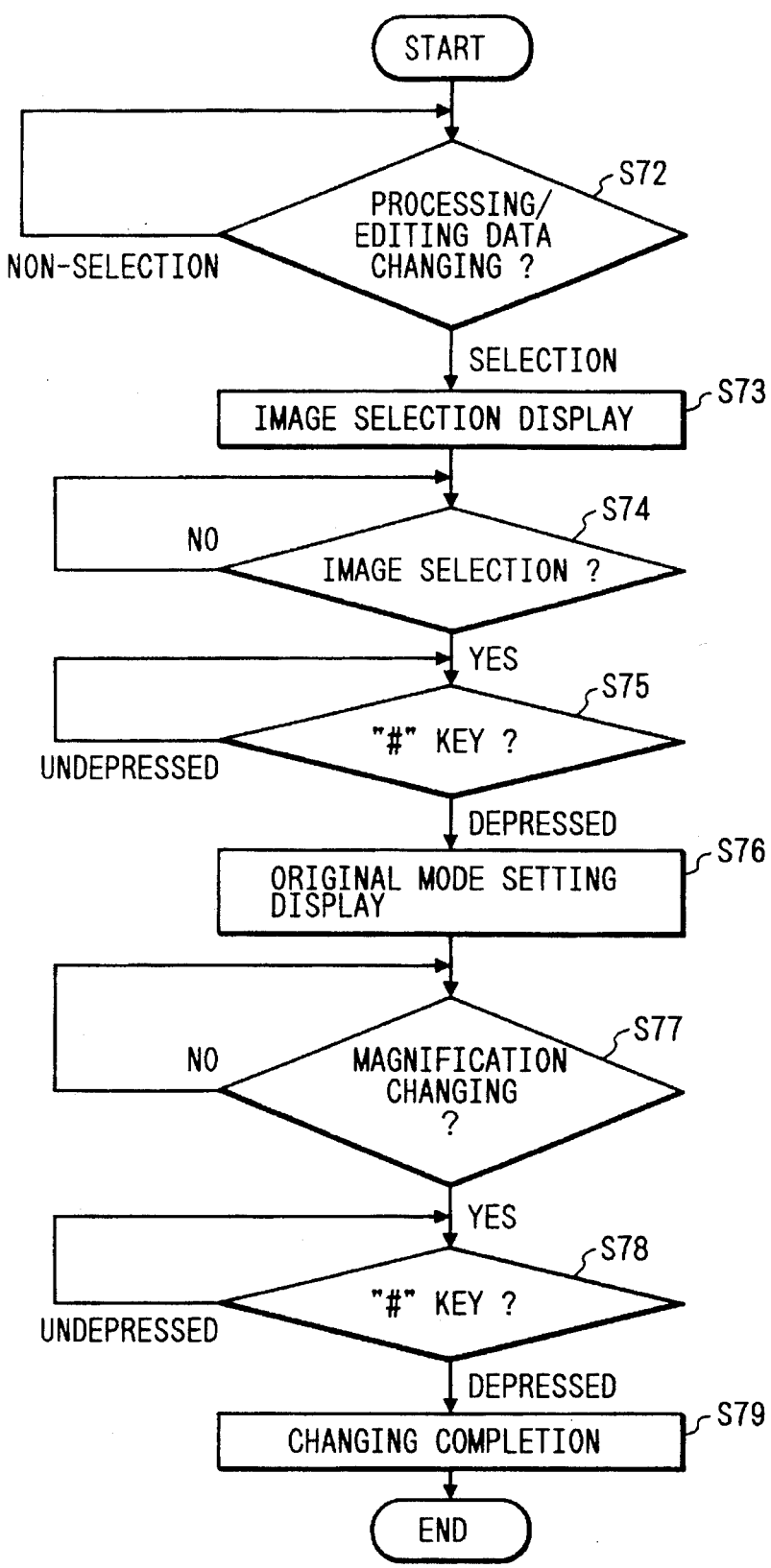
FIG. 21 is a flow chart illustrating the operation for altering only processing/editing data in the third embodiment.
Figure 22:
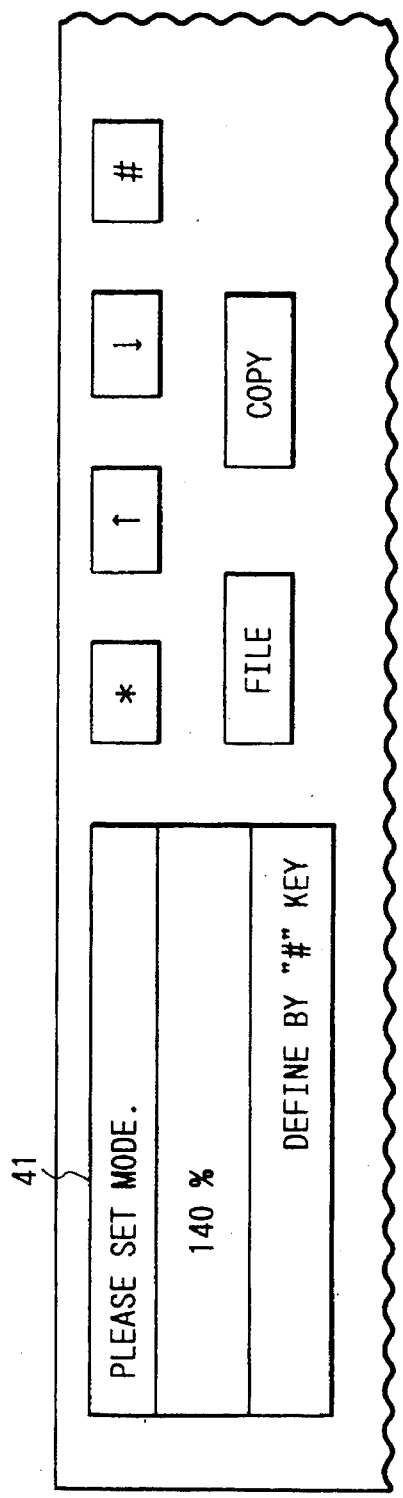
FIG. 22 is a plan view of the display section of the third embodiment, displaying a mode setting menu in which instructions are being given for a size change from 50% to 140%.
Figure 23:
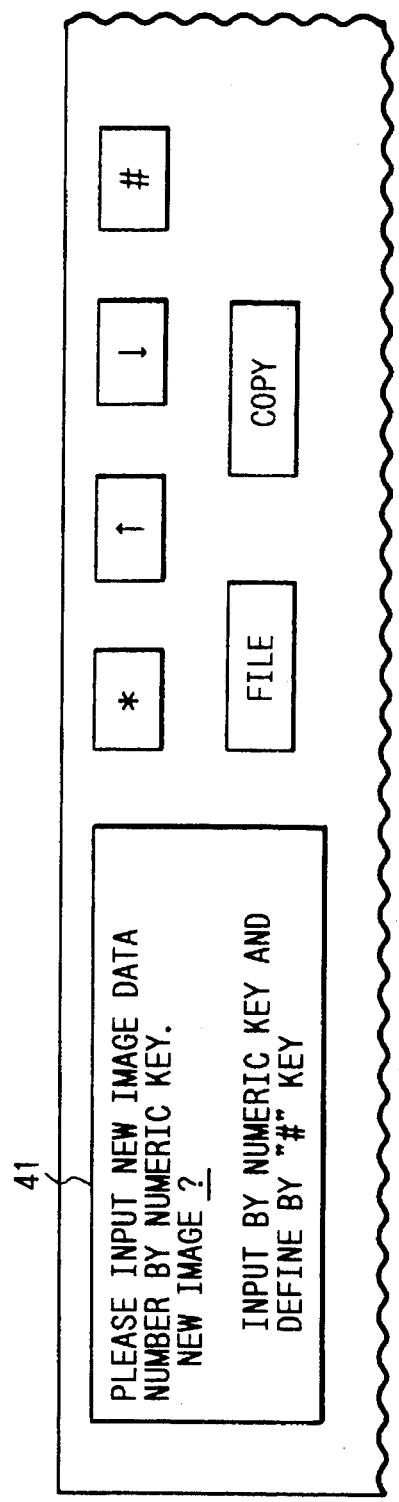
FIG. 23 is a plan view of a display section of a fourth embodiment, displaying a menu for entering a new image number.

In this modification, steps S71 to S74 which are the same as those in the flow shown in FIG. 21 are executed so that the image identification number corresponding to the original processing/editing data to be changed is determined. In the fourth embodiment, pressing of the "#" key in step S74 causes the display to show a menu for entry of a new image data number. The operator then enters the new image data number by means of the ten-key device 47 (see FIG. 24). Then, steps which are the same as steps S76 onwards in FIG. 21 are executed to call the original processing/editing data. After changing the original processing/editing data, the operator presses the "#" key 43 to complete the change of the processing/editing data. Consequently, the new processing/editing data is transmitted to the filing unit 11 and is stored in an area different from the area storing the original processing/editing data in the opto-magnetic disk. Thus, two kinds of processing/editing data are stored and are applicable to the common original image data. By selectively using these two types of image processing/editing data, it is possible to obtain two types of image data output by the selective use of these two types of processing/editing data. This selection can be done at the time of selection of the identification number which is conducted in the operation for outputting the image data.

Although increase and reduction in the image size have been described as the processing/edition of the image data, it will be understood that other types of processing/edition can be performed equally well.

Although the invention has been described through its specific forms, it is to be understood that the described embodiments are not exclusive and various changes and modifications may be imparted thereto without departing from the scope of the invention which is limited solely by the appended claims.

What is claimed is:

1. An image processing apparatus for storing data in a storage medium, said processing apparatus comprising:

input means for inputting an original image;

mode setting means for setting an editorial processing mode to be executed on the input image;

processing means for performing editorial processing on the input image, in accordance with the editorial processing mode set by said mode setting means, to produce an edited image;

generating means for generating reproduction data, which is used for reproducing the original image in an unedited state by further processing the edited image;

storage control means for separately storing the edited image and the reproduction data in the storage medium; and reproduction means for reading the edited image and the reproduction data from the storage medium and for processing the edited image in accordance with the reproduction data to reproduce the original image in an unedited state.

2. An image processing apparatus according to claim 1, wherein the storage medium comprises a demountable storage medium.

3. An image processing apparatus according to claim 1, wherein the reproduction data includes region data indicative of a region of the input image that has been edited.

4. An image processing apparatus for storing data in a storage medium, said image processing apparatus comprising:

reading means for reading an original image;

mode setting means for setting an editorial processing mode to be applied to the original image read by said reading means;

processing means for performing an editorial processing on the original image in accordance with the editorial processing mode set by said mode setting means to produce an edited image;

image forming means for forming the edited image on a recording sheet;

storage means for storing the edited image in the storage medium;

selection means for selecting one of a copy mode and a filing mode;

control means for (i) generating reproduction data, which is used for reproducing the original image in an unedited state by further processing the edited image and causing said storage means to separately store the reproduction data and the edited image in the storage medium when said selection means selects the filing mode and (ii) causing said image forming means to form the edited image on the recording sheet when said selection means selects the copy mode; and reproduction means for reading the edited image and the reproduction data from the storage medium and for processing the edited image in accordance with the reproduction data to reproduce the original image in an unedited state.

5. An image processing apparatus according to claim 4, wherein the reproduction data includes region data indicative of a region of the image that has been edited.

6. An image processing method for storing data in a storage medium, said processing method comprising:

inputting an original image;

setting an editorial processing mode to be executed on the input image;

performing editorial processing on the input image, in accordance with the editorial processing mode set in said setting step, to produce an edited image;

generating reproduction data, which is used for reproducing the original image in an unedited state by further processing the edited image;

separately storing the edited image and the reproduction data in the storage medium;

reading the edited image and the reproduction data from the storage medium; and processing the edited image in accordance with the reproduction data to reproduce the original image in an unedited state.

7. An image processing method for storing data in a storage medium, said image processing method comprising:

reading an original image;

setting an editorial processing mode to be applied to the original image read in said reading step;

performing an editorial processing on the original image in accordance with the editorial processing mode set in said setting step, to produce an edited image;

forming the edited image on a recording sheet using image forming means;

storing the edited image in the storage medium using storage means;

selecting one of a copy mode and a filing mode using selection means;

a control step for (i) generating reproduction data, which is used for reproducing the original image in an unedited state by further processing the edited image and causing the storage means to separately store the reproduction data and the edited image in the storage medium when the selection means selects the filing mode and (ii) causing the image forming means to form the edited image on the recording sheet when the selection means selects the copy mode;

reading the edited image and the reproduction data from the storage medium; and processing the edited image in accordance with the reproduction data to reproduce the original image in an unedited state.

* * * * *